Dec. 26, 1967  M. ROSSNAN  3,359,625

METHOD OF MAKING A FISHING DEVICE

Filed Aug. 18, 1965

INVENTOR
Michael Rossnan

Patented Dec. 26, 1967

3,359,625
METHOD OF MAKING A FISHING DEVICE
Michael Rossnan, 11724 Lovejoy St.,
Silver Spring, Md. 20902
Filed Aug. 18, 1965, Ser. No. 480,683
1 Claim. (Cl. 29—436)

My present invention relates to improvements in the method of making fishing devices, and relates more particularly to the fishing device set forth in my Patent Number 3,205,607 to be issued Sept. 14, 1965. Object of the invention is the provision of a method whereby a step-by-step operation using a line attached main hook as the main support from other various elements to produce a multiple fishing hook.

In order that the method may be fully understood and its advantages appreciated, attention is invited to the accompanying drawings, in which.

Figure 1:
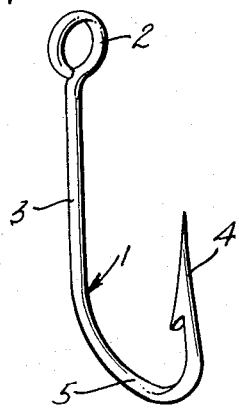
FIGURE 1 is a perspective view of the main carrying hook.
Figure 2:
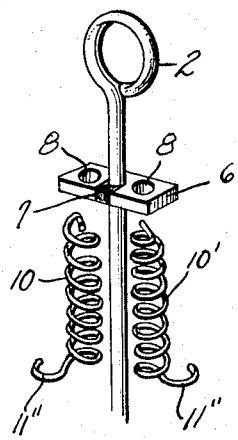
FIGURE 2 is a perspective view showing the next step with the two coiled springs loose and ready for the next step.
Figure 3:
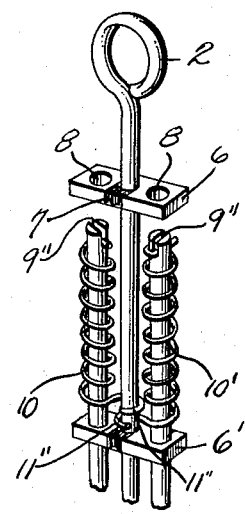
FIGURE 3 shows the third step in which the two oscillatory hooks carry the springs.
Figure 4:
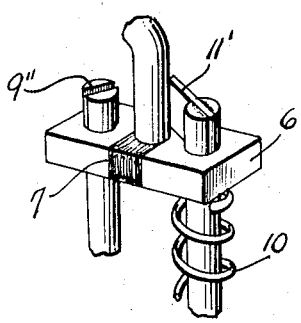
FIGURE 4 is a perspective view of a portion of the main hook and the upper end of the shank of the oscillatory hook, with the welded wedge that prevents longitudinal movement of the oscillatory hook in one direction, while the upper end of the spring prevents its movement in the opposite direction, the wedge also acting to limit the oscillatory movement of its hook.
Figure 5:
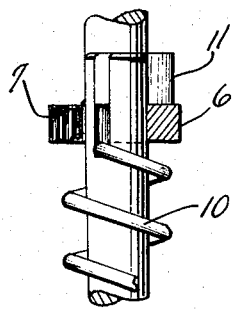
FIGURE 5 is a partial portion of the main hook, one oscillatory hook showing the wedge and spring positioned to prevent longitudinal movement of the shank of the oscillatory hook.

Referring to the drawings, the numeral 1 designates the main carrying hook, having the line receiving eye 2, its shank portion 3, its barb portion 4, and its bite portion 5. The plates 6 and 6' each of which have shank portion embracing slot 7, and the two journals 8, having their slot welded to the shank portion of the main carrying hook, and form the support for the two oscillatory hooks 9 and 9', each of which is provided with a wedge receiving slot 9'', in the end. One at a time this portion of the oscillatory hook is passed through the journal opening of the lower plate to receive its spring 10, as shown in FIGURE 3, the upper end of the spring being then inserted in the lower end of the slot of the shanks upper end, and the upper end of the shank being passed through the opening in the upper plate, where the wedge 11, is now placed in the slot and welded therein, to have its end 11', project to provide a limit to the movement of the oscillatory hook when spring actuated the lower end 11'' of the spring being anchored around the shank of the main hook, above the lower plate.

This action is repeated for the mounting of the second oscillatory hook, the only difference being that the spring 10' has a tension opposite to the spring 10, so that when the hooks, as anchored by a trigger 13, is released, both oscillatory hooks will be released to spring action, and will move in opposite directions to present three bite and barb portions at approximately 120° angle from the bite and barb portion of the main carrying hook.

Figure 7:
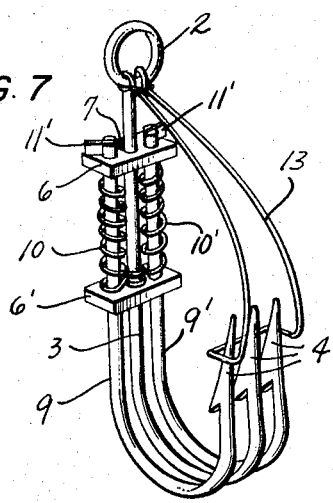
FIGURE 7 is a perspective view of the completed hook, with the trigger holding the bite and barbed portions of the main carrying hook, and the two oscillatory hooks in parallel.
Figure 6:
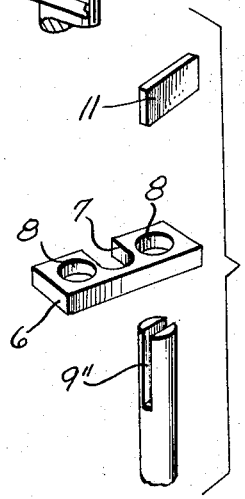
FIGURE 6 is a perspective view of one of the anchoring plates per se.

It will thus be seen by this step-by-step operation, the main carrying hook with its two welded on plates, provides means for proper assembly of the spring actuated oscillatory hooks, which may have one or two of these hooks, and instead of being held as in FIGURE 7, by a trigger may be held thusly by a bait.

What I claim as new is:

The method of making a fishing device, comprising attaching by welding two plates to the shank portion of a hook having a line attaching terminal, a shank portion and a bite and a barb portion, slidingly mounting for oscillation in said plates the shank portion of a hook, whose upper end is provided with a slot, affixing a coiled spring on the shank portion of the oscillatory hook as the shank portion is being projected through the lower plate, and anchoring the upper terminal of the spring in the lower end of the slot, projecting the slotted end of the hook through the upper plate, welding a metal wedge in the said slot with one end projecting far enough to abut the upper end of the shank of the main carrying hook, and anchoring the lower end of the spring to the shank portion of the main carrying hook adjacent to the lower plate.

References Cited
UNITED STATES PATENTS

| | | | |
|---|---|---|---|
| 2,257,403 | 9/1941 | Vandine | 43—44.6 |
| 2,602,689 | 7/1952 | Matz | 43—36 X |
| 2,814,149 | 11/1957 | Hunicke. | |
| 3,222,814 | 12/1965 | Rossman | 43—36 |

CHARLIE T. MOON, *Primary Examiner.*